(12) United States Patent
Yasutomo

(10) Patent No.: US 12,522,952 B2
(45) Date of Patent: Jan. 13, 2026

(54) CORE-SHEATH CONJUGATE FIBER FOR ARTIFICIAL HAIR, HAIR ORNAMENT INCLUDING SAME, AND METHOD FOR PRODUCING SAME

(71) Applicant: KANEKA CORPORATION, Osaka (JP)

(72) Inventor: Norikazu Yasutomo, Osaka (JP)

(73) Assignee: KANEKA CORPORATION, Osaka (JP)

( * ) Notice: Subject to any disclaimer, the term of this patent is extended or adjusted under 35 U.S.C. 154(b) by 347 days.

(21) Appl. No.: 18/253,723

(22) PCT Filed: Oct. 20, 2021

(86) PCT No.: PCT/JP2021/038787
§ 371 (c)(1),
(2) Date: May 19, 2023

(87) PCT Pub. No.: WO2022/145115
PCT Pub. Date: Jul. 7, 2022

(65) Prior Publication Data
US 2023/0416947 A1  Dec. 28, 2023

(30) Foreign Application Priority Data
Dec. 28, 2020 (JP) .................. 2020-219461

(51) Int. Cl.
*D01F 8/12* (2006.01)
*A41G 3/00* (2006.01)
(Continued)

(52) U.S. Cl.
CPC ............. *D01F 8/12* (2013.01); *A41G 3/0083* (2013.01); *A41G 5/004* (2013.01); *A63H 3/44* (2013.01);
(Continued)

(58) Field of Classification Search
CPC ..... D01F 8/12; D01F 8/14; D01F 1/04; D01F 1/07; A41G 3/0083; A41G 5/004;
(Continued)

(56) References Cited

U.S. PATENT DOCUMENTS 4,916,013 A    4/1990 Maeda et al.
2016/0088888 A1  3/2016 Yorizane et al.
(Continued)

FOREIGN PATENT DOCUMENTS

EP    0 320 521 A1    6/1989
EP    3 603 432 A1    2/2020
(Continued)

OTHER PUBLICATIONS

English translation of JP-2008075210-A to Tomokazu et al. obtained from PE2E database. (Year: 2008).*
(Continued)

*Primary Examiner* — Jeremy R Pierce
(74) *Attorney, Agent, or Firm* — Studebaker Brackett PLLC

(57) ABSTRACT

One or more embodiments of the present invention relate to a core-sheath conjugate fiber for artificial hair that includes a core and a sheath. The core is composed of a polyester-based resin composition containing a polyester-based resin as a main component, and the sheath is composed of a polyamide-based resin composition containing a polyamide-based resin as a main component. The polyester-based resin composition and the polyamide-based resin composition contain a bromine-based flame retardant. In the core-sheath conjugate fiber for artificial hair, a core-to-sheath area ratio of the core to the sheath is 2:8 to 8:2. A fiber cross-section of the core-sheath conjugate fiber for artificial hair has a flat multilobed shape, and the fiber cross-section includes a hollow portion. A ratio of an area of the hollow portion to a (Continued)

total area of the fiber cross-section is 5% or more and 30% or less. The hollow portion has a polygonal shape. As a result, fibers for artificial hair that have a texture similar to that of human hair, high durability, favorable curl setting properties, and high flame resistance are provided.

18 Claims, 3 Drawing Sheets

(51) Int. Cl.
*A41G 5/00* (2006.01)
*A45D 8/00* (2006.01)
*A63H 3/44* (2006.01)
*D01D 5/08* (2006.01)
*D01D 5/24* (2006.01)
*D01D 5/253* (2006.01)
*D01D 5/34* (2006.01)
*D01F 1/04* (2006.01)
*D01F 1/07* (2006.01)
*D01F 8/14* (2006.01)

(52) U.S. Cl.
CPC ............... *D01D 5/08* (2013.01); *D01D 5/24* (2013.01); *D01D 5/253* (2013.01); *D01D 5/34* (2013.01); *D01F 1/04* (2013.01); *D01F 1/07* (2013.01); *D01F 8/14* (2013.01); *D10B 2331/02* (2013.01); *D10B 2331/04* (2013.01); *D10B 2401/04* (2013.01); *D10B 2503/08* (2013.01)

(58) Field of Classification Search
CPC .. A63H 3/44; D10B 2331/02; D10B 2331/04; D10B 2401/04; D10B 2503/08; D01D 5/08; D01D 5/24; D01D 5/253; D01D 5/34

See application file for complete search history.

(56) References Cited

U.S. PATENT DOCUMENTS

| | | |
|---|---|---|
| 2018/0343945 A1 | 12/2018 | Yorizane et al. |
| 2020/0024774 A1 | 1/2020 | Yasutomo et al. |
| 2021/0361011 A1 | 11/2021 | Yasutomo et al. |

FOREIGN PATENT DOCUMENTS

| | | | |
|---|---|---|---|
| JP | S63-12716 A | | 1/1988 |
| JP | H03-185103 A | | 8/1991 |
| JP | 2008075210 A | * | 4/2008 |
| WO | 2014/196642 A1 | | 12/2014 |
| WO | 2018/179803 A1 | | 10/2018 |
| WO | 2020/166262 A1 | | 8/2020 |

OTHER PUBLICATIONS

International Search Report issued in PCT/JP2021/038787; mailed Dec. 28, 2021.

* cited by examiner

CORE-SHEATH CONJUGATE FIBER FOR ARTIFICIAL HAIR, HAIR ORNAMENT INCLUDING SAME, AND METHOD FOR PRODUCING SAME

TECHNICAL FIELD

One or more embodiments of the present invention relate to core-sheath conjugate fibers for artificial hair that can be used as an alternative to human hair, hair ornaments including the core-sheath conjugate fibers for artificial hair, and a method for producing the core-sheath conjugate fibers for artificial hair.

BACKGROUND ART

Human hair has conventionally been used for hair ornaments such as hairpieces, hair wigs, hair extensions, hair bands, and doll hair. However, in recent years, it has become difficult to obtain human hair. For this reason, there is a growing demand for artificial hair that can replace human hair. Examples of artificial hair fibers include acrylic fibers, vinyl chloride fibers, vinylidene chloride fibers, polyester fibers, polyamide fibers, and polyolefin fibers. In particular, a core-sheath conjugate fiber containing polyester as a core component and polyamide as a sheath component has been proposed as an artificial hair fiber that has a feel similar to that of human hair and has high durability and heat resistance. Patent Document 1 discloses that in a melt spinning method, polyethylene terephthalate with a high degree of polymerization and polyamide with a high degree of polymerization are used, rapidly solidified through liquid cooling, allowed to pass through a fiber surface layer crystallization facilitating device to provide a specific stripe-shaped uneven structure to the fiber surface, and thereby it is possible to obtain a fiber for artificial hair in which the strength of core-sheath conjugate fibers is ensured, and the gloss of the polyamide of the sheath is suppressed, and that has a feel similar to that of human hair, and has high durability, for example.

CITATION LIST

Patent Document

[Patent Document 1] JP H3-185103A

DISCLOSURE OF INVENTION

Problem to be Solved by the Invention

However, although a fiber for artificial hair in which polyamide is used in the sheath as described in Patent Document 1 has a good texture and high durability, it has a problem of poor curl setting properties.

Further, in recent years, there has been a demand for imparting flame resistance to fibers for artificial hair.

In order to solve the conventional problems, one or more embodiments of the present invention provide fibers for artificial hair that have a texture similar to that of human hair, high durability, favorable curl setting properties, and high flame resistance.

Means for Solving Problem

One or more embodiments of the present invention relate to a core-sheath conjugate fiber for artificial hair that includes a core and a sheath. The core is composed of a polyester-based resin composition containing a polyester-based resin, and the sheath is composed of a polyamide-based resin composition containing a polyamide-based resin. The polyester-based resin composition and the polyamide-based resin composition contain a bromine-based flame retardant. In the core-sheath conjugate fiber for artificial hair, a core-to-sheath area ratio of the core to the sheath is 2:8 to 8:2. A fiber cross-section of the core-sheath conjugate fiber for artificial hair has a flat multilobed shape, and the fiber cross-section includes a hollow portion. A ratio of an area of the hollow portion to a total area of the fiber cross-section is 5% or more and 30% or less. The hollow portion has a polygonal shape.

One or more embodiments of the present invention also relate to a hair ornament including the core-sheath conjugate fiber for artificial hair.

One or more embodiments of the present invention relate to a method for producing the core-sheath conjugate fiber for artificial hair, the method including melt spinning a polyester-based resin composition and a polyamide-based resin composition using a core-sheath conjugate spinning nozzle, in which a hollow portion having a polygonal shape is formed in a fiber cross-section, and a ratio of the area of the hollow portion to the total area of the fiber cross-section is 5% or more and 30% or less.

Effects of the Invention

One or more embodiments of the present invention can provide core-sheath conjugate fibers for artificial hair that have a texture similar to that of human hair, high durability, favorable curl setting properties, and high flame resistance, and a hair ornament that includes the core-sheath conjugate fibers for artificial hair.

Further, according to a production method of one or more embodiments of the present invention, it is possible to obtain core-sheath conjugate fibers for artificial hair that have a texture similar to that of human hair, high durability, favorable curl setting properties, and high flame resistance.

DESCRIPTION OF THE INVENTION

Figure 1:
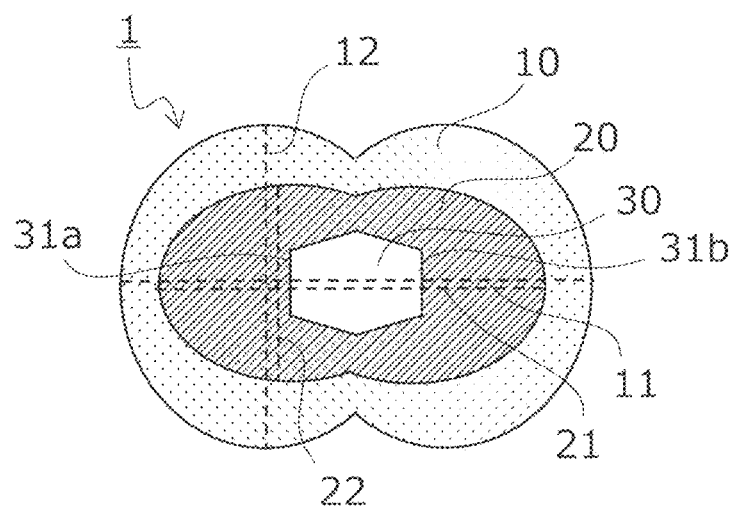
FIG. 1 is a schematic view showing a fiber cross-section of a core-sheath conjugate fiber for artificial hair according to one or more embodiments of the present invention.

The inventor of the present invention conducted intensive studies in order to resolve the above issues and found that core-sheath conjugate fibers for artificial hair (also simply referred to as "core-sheath conjugate fibers" in the following) that have a texture that is similar to that of human hair, high durability, favorable curl setting properties and high flame resistance could be obtained as a result of, in a core-sheath conjugate fiber for artificial hair in which a core is composed of a polyester-based resin composition containing a polyester-based resin as a main component and a sheath is composed of a polyamide-based resin composition containing a polyamide-based resin as a main component, adding a bromine-based flame retardant to the polyester-based resin composition and the polyamide-based resin composition, setting a core-to-sheath area ratio of the core to the sheath to 2:8 to 8:2, forming a cross-section of the core-sheath conjugate fiber into a flat multilobed shape, forming a hollow portion having polygonal shape in the fiber cross-section, and setting a ratio of an area of the hollow portion to a total area of the fiber cross-section to 5% or more and 30% or less, thus completing the present invention.

(Fiber Shape)

The core-sheath conjugate fiber for artificial hair according to one or more embodiments of the present invention includes a core and a sheath, and preferably has a flat multilobed cross-sectional shape. In the core-sheath conjugate fiber for artificial hair according to one or more embodiments of the present invention, the core also preferably has a flat multilobed cross-sectional shape. In one or more embodiments of the present invention, the fiber cross-section and the core cross-section more preferably have the same flat multilobed cross-sectional shape in which a major axis of the core cross-section is in a direction that substantially coincides with a direction of a major axis of the fiber cross-section. In one or more embodiments of the present invention, the wording "the major axis of the core cross-section is in a direction that substantially coincides with a direction of the major axis of the fiber cross-section" indicates that an angle formed between the major axis of the fiber cross-section and the major axis of the core cross-section is less than 15 degrees. In the case of the same flat multilobed shape in which the major axis of the core cross-section is in a direction that substantially coincides with the direction of the major axis of the fiber cross-section, because the outer circumferential shape of the fiber cross-section and the outer circumferential shape of the core cross-section are similar to each other on a fiber cross-section, the sheath has an even thickness, and thus a good texture and a favorable appearance of the fiber for artificial hair are maintained and it is possible to prevent the core from being exposed from the fiber surface. Examples of the flat multilobed shape include a shape in which two or more lobed portions having a shape selected from the group consisting of a circular shape and an elliptical shape are connected via recesses. In a flat multilobed shape, a circular and/or elliptical shape partially overlap each other at the connected portion. Further, the shape of the circular or elliptical portions does not absolutely have to be a continuous arc, and may also be a substantially circular shape or substantially elliptical shape that is partially deformed, as long as no acute angle is formed. Furthermore, no consideration needs to be given to an unevenness with a size of 2 μm or less generated at an outer circumference of the fiber cross-section and an outer circumference of the core due to an additive or the like contained.

It is preferable that, in the core-sheath conjugate fiber for artificial hair according to one or more embodiments of the present invention, a fiber cross-section has a hollow portion, and the center position of the hollow portion matches the center position of the fiber. It is preferable that, on a fiber cross-section, the core is present in the sheath, and the hollow portion is present in the core. The core-sheath conjugate fiber for artificial hair may have a concentric structure in which the center position of the core matches the center position of the fiber, or have an eccentric structure in which the center position of the core does not match the center position of the fiber and is eccentric. It is preferable that the core-sheath conjugate fiber for artificial hair has a concentric structure in which the center positions of the core and the hollow portion match the center position of the fiber, from the viewpoint of spinning stability and curl setting properties.

FIG. 1 is a schematic view showing a fiber cross-section of a core-sheath conjugate fiber for artificial hair according to one or more embodiments of the present invention. A core-sheath conjugate fiber 1 for artificial hair according to an embodiment includes a sheath 10, a core 20, and a hollow portion 30. On a fiber cross-section, the fiber 1 and the core 20 have a flat bibbed cross-sectional shape (outer circumferential shape) in which two elliptical portions are connected via recesses, the hollow portion 30 having polygonal shape is formed in a center portion of the fiber cross-section 1, and the hollow portion 30 includes a first side 31a that is perpendicular to a major axis 11 of the fiber cross-section 1 and a second side 31b that is perpendicular to the major axis 11 of the fiber cross-section 1.

It is preferable that, on a fiber cross-section of the core-sheath conjugate fiber for artificial hair according to one or more embodiments of the present invention, a length of the major axis 11 of the fiber cross-section, where the major axis 11 of the fiber cross-section is a longest straight line among an axisymmetric axis and straight lines connecting any two points on the outer circumference of the fiber cross-section so as to be parallel to the axisymmetric axis, and a length of a first minor axis 12 of the fiber cross-section, where the first minor axis 12 of the fiber cross-section is a longest straight line formed when any two points on the outer circumference of the fiber cross-section are connected perpendicularly to the major axis 11 of the fiber cross-section, satisfy the equation (1) below.

The length of the major axis of the fiber cross-section/the length of the first minor axis of the fiber cross-section=1.1 or more and 2.0 or less   (1)

Further, it is preferable that, on a fiber cross-section, a length of the major axis 21 of the core cross-section, where the major axis 21 of the core cross-section is a longest straight line among an axisymmetric axis and straight lines connecting any two points on the outer circumference of the core cross-section so as to be parallel to the axisymmetric axis, and a length of a first minor axis 22 of the core cross-section, where the first minor axis 22 of the core cross-section is a longest straight line formed when any two points on the outer circumference of the core cross-section are connected perpendicularly to the major axis 21 of the core cross-section, satisfy the equation (2) below.

The length of the major axis of the core cross-section/the length of the first minor axis of the core cross-section=1.3 or more and 2.0 or less   (2)

On a fiber cross-section of the core-sheath conjugate fiber for artificial hair according to one or more embodiments of the present invention, a center point of the major axis of the core cross-section preferably matches a center point of the major axis of the fiber cross-section, thus suppressing creation of undesired crimps.

In one or more embodiments of the present invention, the core-sheath conjugate fiber for artificial hair has a flat multilobed fiber cross-section, which results in a shape in which two or more circular or elliptical lobed portions are connected via recesses. Thus, because the fiber surface has smooth unevenness, the contact area of fibers and the area of contact with a hair comb occurred when running the hair comb are reduced, and thus a texture similar to that of human hair and a favorable combing property can be realized with ease.

In one or more embodiments of the present invention, the hollow portion preferably has a polygonal shape having a first side that is substantially perpendicular to the major axis of the fiber cross-section and a second side that is substantially perpendicular to the major axis of the fiber cross-section, and specifically, preferably has a polygonal shape having a first side with an angle of 70 degrees or more and 110 degrees or less with respect to the major axis of the fiber cross-section, and a second side with an angle of 70 degrees or more and 110 degrees or less with respect to the major axis of the fiber cross-section. Accordingly, when bending stress is applied to the fiber under heating during setting curls, stress is applied along lines (first and second sides) instead of applying stress only to specific local portions (points) as in a case where the hollow portion is circular or elliptical, and thermal stress relaxation occurs uniformly over a wide region, thus improving curl setting properties. Further, when pressure is applied to the fiber as well, it is possible support the pressure on the lines (first and second sides), instead of supporting pressure at points as in the case of circular or elliptical hollow portions. Accordingly, stress is not concentrated in a specific local portion. Thus, it is possible to suppress a phenomenon in which a fiber cross-section collapses, and also to prevent separation of the sheath from the core. It is preferable that the angle of the first side of the hollow portion with respect to the major axis of the fiber cross-section is 80 degrees or more and 100 degrees or less. It is also preferable that the angle of the second side of the hollow portion with respect to the major axis of the fiber cross-section is 80 degrees or more and 100 degrees or less. In the present invention, the wording "the angle of the first side of the hollow portion with respect to the major axis of the fiber cross-section" refers to the average of the angles thereof as for cross-sections of thirty fibers selected at random. Note that, on the cross-sections of thirty fibers selected at random, both the largest angle and the smallest angle of the first side of the hollow portion with respect to the major axis are preferably within the above range. Also, in the present invention, the wording "the angle of the second side of the hollow portion with respect to the major axis of the fiber cross-section" refers to the average of the angles thereof as for cross-sections of thirty fibers selected at random. Note that, on the cross-sections of thirty fibers selected at random, both the largest angle and the smallest angle of the second side of the hollow portion with respect to the major axis of the fiber cross-section are preferably within the above range.

In one or more embodiments of the present invention, from the viewpoint of curl setting properties and a combing property, on a fiber cross-section, the first side and the second side of the hollow portion are preferably substantially in parallel to each other, and specifically, the angle between the first side and the second side is preferably within a range of 0 degrees or more and 40 degrees or less.

Figure 2A:
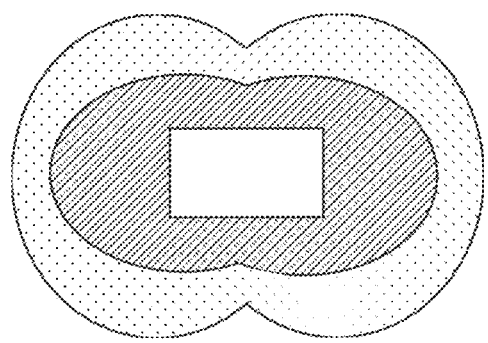
FIG. 2A is a schematic view showing a fiber cross-section of a flat bibbed core-sheath conjugate fiber having a quadrangular hollow portion.
Figure 2B:
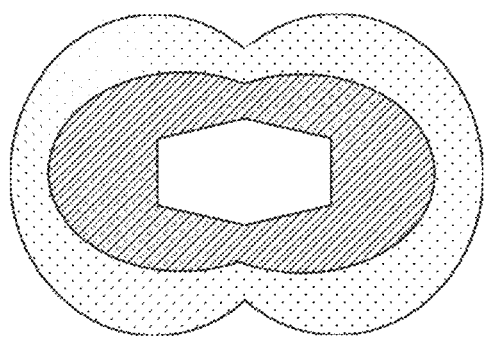
FIG. 2B is a schematic view showing a fiber cross-section of a flat bibbed core-sheath conjugate fiber having a hexagonal hollow portion.

In one or more embodiments of the present invention, the hollow portion includes the first side that is substantially perpendicular to the major axis of the fiber cross-section and the second side that is substantially perpendicular to the major axis of the fiber cross-section as described above, and the hollow portion preferably has a polygonal shape in which the first side and the second side are substantially in parallel to each other. Although there is no particular limitation on a specific shape of the hollow portion, the specific shape thereof is preferably quadrangular, pentagonal, hexagonal, heptagonal, octagonal, or the like, from the viewpoint of ensuring a high hollowness ratio, dispersing corner stress, and suppressing surface reflection, for example. An example of a quadrangular shape is illustrated in FIG. 2A, and an example of a hexagonal shape is illustrated in FIG. 2B.

In one or more embodiments of the present invention, the first side and the second side of the hollow portion preferably have a length of 5 μm or more and 50 μm or less, and more preferably have a length of 10 μm or more and 30 μm or less. In the present invention, the term "the length of the first side of the hollow portion" refers to the average of the lengths thereof as for cross-sections of thirty fibers selected at random. Note that, on the cross-sections of thirty fibers selected at random, both the longest length and the shortest length of the first side of the hollow portion are preferably within the above range. Further, in the present invention, the term "the length of the second side of the hollow portion" refers to the average of the lengths thereof as for cross-sections of thirty fibers selected at random. Note that, on the cross-sections of thirty fibers selected at random, both the longest length and the shortest length of the second side of the hollow portion are preferably within the above range. If the first side and the second side have a length of 5 μm or more, stress is not locally concentrated, curl setting properties are improved, the sheath is less likely to separate from the core, and a fiber cross-section is less likely to collapse. Also, fibers are less likely to get entangled, and the combing property is also improved. If the first side and the second side have a length of 50 μm or less, the outer periphery of the fiber and the outer periphery of the hollow portion separate from each other. Therefore, the fiber is not excessively thin, curl setting properties are improved, the sheath is less likely to separate from the core, and a fiber cross-section is less likely to collapse. Also, fibers are less likely to get entangled, and the combing property is also improved.

In one or more embodiments of the present invention, a ratio of the area of the hollow portion with respect to the total area of the fiber cross-section (also referred to as a "hollowness ratio" in the following) is 5% or more and 30% or less. In the present invention, the total area of the fiber cross-section refers to the area of a portion defined by a peripheral portion of the fiber in a cross-section (transverse cross-section) obtained by cutting the fiber vertically, which includes the area of the hollow portion. Because a hollow portion is present in a fiber cross-section in the fiber for artificial hair according to one or more embodiments of the present invention, the need to heat or cool a center portion of the fiber when setting hair with a hair iron is eliminated, thus shortening the cooling time. Also, when fibers are formed into a bundle of the fibers (hair bundle) having the same volume, due to a fiber cross-section having a hollow portion, the fiber bundle is lighter in weight than a fiber bundle formed using fibers having no hollow portion, and thus it is also possible to suppress a phenomenon in which a curl extends overtime under its own weight. As described above, from the viewpoint of maintaining a curled shape, it is desired that the hollow portion is large. However, as the hollow portion becomes larger, the thickness of the fiber becomes comparatively thinner, which makes it difficult to maintain the shape of the fiber cross-section, and increases the likelihood of deformation or collapse due to pressure. If the hollowness ratio of the fiber cross-section is more than 30%, the sheath is likely to separate from the core, and the shape of the fiber cross-section may not be able to be maintained. From the viewpoint that the time it takes for cooling can be shortened, and curl setting properties are improved, the sheath is less likely to separate from the core, the shape of a fiber cross-section can be easily maintained, fibers do not get entangled, and the combing property is favorable, the hollowness ratio of the fiber cross-section is preferably 7% or more and 30% or less, more preferably 10% or more and 30% or less, and even more preferably 10% or more and 25% or less. In the present invention, the term "hollowness ratio" refers to the average of hollowness ratios of cross-sections of thirty fibers selected at random. Note that, on the cross-sections of thirty fibers selected at random, both the highest hollowness ratio and the lowest hollowness ratio of cross-sections of thirty fibers selected at random are preferably within the above range.

The above-described cross-sectional shapes of the fiber, the core, and the hollow portion can be controlled by using a nozzle (pores) with a shape close to the target cross-sectional shape.

In one or more embodiments of the present invention, the core-to-sheath area ratio of the core to the sheath of the core-sheath conjugate fiber for artificial hair is 2:8 to 8:2. When the core-to-sheath area ratio is in this range, a flexural rigidity value, which is a physical property related to a texture, a feel, and the like, is similar to that of human hair, and thus core-sheath conjugate fibers for artificial hair with a quality similar to that of human hair can be obtained. If the area of the core is smaller than this range, the flexural rigidity value is lower than that in human hair, and thus core-sheath conjugate fibers for artificial hair with a quality similar to that of human hair cannot be obtained. On the other hand, if the area of the core is larger than this range, the flexural rigidity value is excessively large and thus is not similar to that of human hair, and, moreover, the sheath is so thin that the core is likely to be exposed, and the core and the sheath are likely to separate from each other. In one or more embodiments of the present invention, from the viewpoint of obtaining a texture and a feel that are similar to those of human hair, the core-to-sheath area ratio of the core to the sheath of the core-sheath conjugate fiber for artificial hair is preferably 3:7 to 7:3, and more preferably 4:6 to 6:4. In order to prevent separation of the sheath from the core on a fiber cross-section of the core-sheath conjugate fiber for artificial hair, it is preferable that the core is not exposed from the fiber surface and is completely covered by the sheath.

From the viewpoint of suitability for artificial hair, the core-sheath conjugate fiber for artificial hair according to one or more embodiments of the present invention, has a single fiber fineness of preferably 10 dtex or more and 150 dtex or less, more preferably 30 dtex or more and 120 dtex or less, even more preferably 40 dtex or more and 100 dtex or less, and even more preferably 50 dtex or more and 90 dtex or less.

When the core-sheath conjugate fibers for artificial hair according to one or more embodiments of the present invention are in the form of an aggregate of fibers, e.g., a fiber bundle, all the fibers do not necessarily have the same fineness, the same core-to-sheath area ratio, and the same cross-sectional shape, but some of them may have different finenesses, different core-to-sheath area ratios, and cross-sectional shapes.

(Resin Composition)

In the core-sheath conjugate fiber for artificial hair according to one or more embodiments of the present invention, the core is composed of a polyester-based resin composition containing a polyester-based resin as a main component, and the sheath is composed of a polyamide-based resin composition containing a polyamide-based resin as a main component.

In one or more embodiments of the present invention, the polyester-based resin composition containing a polyester-based resin as a main component indicates that the polyester-based resin composition contains the polyester-based resin in an amount of more than 50% by weight with respect to 100% by weight of the total weight of the polyester-based resin composition, and the content of the polyester-based resin is preferably 60% by weight or more, more preferably 70% by weight or more, even more preferably 80% by weight or more, further preferably 90% by weight or more, and still more preferably 95% by weight or more.

It is preferable to use, as the polyester-based resin, at least one selected from the group consisting of polyalkylene terephthalate and a copolyester mainly containing polyalkylene terephthalate. In one or more embodiments of the present invention, the wording "copolyester mainly containing the polyalkylene terephthalate" refers to the copolyester containing 80 mol % or more of polyalkylene terephthalate.

Examples of the polyalkylene terephthalate include, but are not particularly limited to, polyethylene terephthalate, polypropylene terephthalate, polybutylene terephthalate, and polycyclohexane dimethylene terephthalate.

Examples of the copolyester mainly containing the polyalkylene terephthalate include, but are not particularly limited to, copolyesters mainly containing polyalkylene terephthalate such as polyethylene terephthalate, polypropylene terephthalate, polybutylene terephthalate, or polycyclohexane dimethylene terephthalate and other copolymerizable components.

Examples of the other copolymerizable components include: polycarboxylic acids such as isophthalic acid, orthophthalic acid, naphthalenedicarboxylic acid, paraphenylenedicarboxylic acid, trimellitic acid, pyromellitic acid, succinic acid, glutaric acid, adipic acid, suberic acid, azelaic acid, sebacic acid, and dodecanedioic acid, and their derivatives; dicarboxylic acids and their derivatives containing sulfonates such as 5-sodiumsulfoisophthalic acid and dihydroxyethyl 5-sodiumsulfoisophthalate; 1,2-propanediol; 1,3-propanediol; 1,4-butanediol; 1,6-hexanediol; neopentyl glycol; 1,4-cyclohexanedimethanol; diethylene glycol; polyethylene glycol; trimethylolpropane; pentaerythritol; 4-hydroxybenzoic acid; ε-caprolactone; and an ethylene glycol ether of bisphenol A.

The copolyester is preferably produced by adding a small amount of other copolymerizable components to polyalkylene terephthalate serving as a main component, and allowing them to react with each other, from the viewpoint of stability and ease of operation. Examples of the polyalkylene terephthalate include a polymer of terephthalic acid and/or its derivatives (e.g., methyl terephthalate) and alkylene glycol. The copolyester may be produced by adding a small amount of monomer or oligomer component serving as other copolymerizable components, to a mixture of terephthalic acid and/or its derivatives (e.g., methyl terephthalate) and alkylene glycol, used for polymerization of polyalkylene terephthalate serving as a main component, and subjecting them to polymerization.

It is sufficient that the copolyester has a structure in which the other copolymerizable components are polycondensed on the main chain and/or side chain of polyalkylene terephthalate serving as a main component, and the copolymerization method and the like are not particularly limited.

Specific examples of the copolyester mainly containing polyalkylene terephthalate include a polyester obtained through copolymerization of polyethylene terephthalate serving as a main component with one compound selected from the group consisting of an ethylene glycol ether of bisphenol A, 1,4-cyclohexanedimethanol, isophthalic acid, and dihydroxyethyl 5-sodiumsulfoisophthalate.

The polyalkylene terephthalate and the copolyester mainly containing polyalkylene terephthalate may be used individually or in a combination of two or more. In particular, polyethylene terephthalate; polypropylene terephthalate; polybutylene terephthalate; a polyester obtained through copolymerization of polyethylene terephthalate serving as a main component with an ethylene glycol ether of bisphenol A; a polyester obtained through copolymerization of polyethylene terephthalate serving as a main component with 1,4-cyclohexanedimethanol; a polyester obtained through copolymerization of polyethylene terephthalate serving as a main component with isophthalic acid; a polyester obtained through copolymerization of polyethylene terephthalate serving as a main component with dihydroxyethyl 5-sodiumsulfoisophthalate, and the like are preferably used individually or in a combination of two or more.

The intrinsic viscosity (also referred to as an "IV value") of the polyester resin is not particularly limited, and is preferably 0.3 dL/g or more and 1.2 dL/g or less, and more preferably 0.4 dL/g or more and 1.0 dL/g or less. When the intrinsic viscosity is dL/g or more, it is possible to prevent a decrease in the mechanical strength of the resulting fibers, and also to eliminate the risk of dripping during a flammability test. When the intrinsic viscosity is 1.2 dL/g or less, the molecular weight does not become too large and the melt viscosity does not become too high, thereby facilitating melt spinning and making the fineness of the fibers more likely to be uniform.

In one or more embodiments of the present invention, the polyester-based resin composition that constitutes the core may contain other resins in addition to the polyester-based resin. Examples of the other resins include a polyamide-based resin, a vinyl chloride-based resin, a modacrylic-based resin, a polycarbonate-based resin, a polyolefin-based resin, and a polyphenylene sulfide-based resin. Other resins may be used individually or in combinations of two or more.

In one or more embodiments of the present invention, a polyamide-based resin composition containing a polyamide-based resin as a main component indicates that the polyamide-based resin composition contains the polyamide-based resin in an amount of more than 50% by weight with respect to 100% by weight of the total weight of the polyamide-based resin composition, and the content of the polyamide-based resin is preferably 60% by weight or more, more preferably 70% by weight or more, even more preferably 80% by weight or more, further preferably 90% by weight or more, and still more preferably 95% by weight or more.

The polyamide-based resin used in the present invention refers to a nylon resin obtained by polymerizing at least one selected from the group consisting of lactam, an aminocarboxylic acid, a mixture of a dicarboxylic acid and diamine, a mixture of a dicarboxylic acid derivative and diamine, and a salt of a dicarboxylic acid and diamine.

Specific examples of the lactam include, but are not particularly limited to, 2-azetidinone, 2-pyrrolidinone, δ-valerolactam, ε-caprolactam, enantholactam, capryl-lactam, undecalactam, and laurolactam. Among them, ε-caprolactam, undecalactam, and laurolactam are preferred, and ε-caprolactam is particularly preferred. These lactams may be used individually or in combinations of two or more.

Specific examples of the aminocarboxylic acid include, but are not particularly limited to, 6-aminocaproic acid, 7-aminoheptanoic acid, 8-aminooctanoic acid, 9-aminononanoic acid, 10-aminodecanoic acid, 11-aminoundecanoic acid, and 12-aminododecanoic acid. Among them, 6-aminocaproic acid, 11-aminoundecanoic acid, and 12-aminododecanoic acid are preferred, and 6-aminocaproic acid is particularly preferred. These aminocarboxylic acids may be used individually or in combinations of two or more.

Specific examples of the dicarboxylic acid, which is used in the mixture of a dicarboxylic acid and diamine, the mixture of a dicarboxylic acid derivative and diamine, or the salt of a dicarboxylic acid and diamine, include, but are not particularly limited to, the following; aliphatic dicarboxylic acids such as oxalic acid, malonic acid, succinic acid, glutaric acid, adipic acid, pimelic acid, suberic acid, azelaic acid, sebacic acid, undecanedioic acid, dodecanedioic acid, brassylic acid, tetradecanedioic acid, pentadecanedioic acid, and octadecanedioic acid; alicyclic dicarboxylic acids such as cyclohexanedicarboxylic acid; and aromatic dicarboxylic acids such as phthalic acid, isophthalic acid, terephthalic acid, and naphthalenedicarboxylic acid. Among them, adipic acid, sebacic acid, dodecanedioic acid, terephthalic acid, and isophthalic acid are preferred, and adipic acid, terephthalic acid, and isophthalic acid are particularly preferred. These dicarboxylic acids may be used individually or in combinations of two or more.

Specific examples of the diamine, which is used in the mixture of a dicarboxylic acid and diamine, the mixture of a dicarboxylic acid derivative and diamine, or the salt of a dicarboxylic acid and diamine, include, but are not particularly limited to, the following; aliphatic diamines such as 1,4-diaminobutane, 1,5-diaminopentane, 1,6-diaminohexane, 2-methyl-1,5-diaminopentane (MDP), 1,7-diaminoheptane, 1,8-diaminooctane, 1,9-diaminononane, 1,10-diaminodecane, 1,11-diaminoundecane, 1,12-diaminododecane, 1,13-diaminotridecane, 1,14-diaminotetradecane, 1,15-diaminopentadecane, 1,16-diaminohexadecane, 1,17-diaminoheptadecane, 1,18-diaminooctadecane, 1,19-diaminononadecane, and 1,20-diaminoeicosane; alicyclic diamines such as cyclohexanediamine and bis-(4-aminohexyl)methane; and aromatic diamines such as m-xylylenediamine and p-xylylenediamine. Among them, aliphatic diamines are preferred, and hexamethylenediamine (1,6-diaminohexane) is particularly preferred. These diamines may be used individually or in combinations of two or more.

Examples of the polyamide-based resin (also referred to as nylon resin) include, but are not particularly limited to, nylon 6, nylon 66, nylon 11, nylon 12, nylon 6/10, nylon 6/12, semi-aromatic nylons including units of nylon 6T and/or nylon 6I, and copolymers of these nylon resins. In particular, nylon 6, nylon 66, and a copolymer of nylon 6 and nylon 66 are more preferred.

The polyamide-based resin can be produced by, e.g., a polyamide-based resin polymerization method that includes heating raw materials for the polyamide-based resin in the presence or absence of a catalyst. The method may or may not include a stirring process during the polymerization, but it is preferable that the raw materials are stirred to obtain a homogeneous product. The polymerization temperature may be set as appropriate in accordance with the degree of polymerization of the target polymer, the reaction yield, and the reaction time, and may be set to be lower in view of the quality of the polyamide-based resin to be obtained. The reaction rate may also be set as appropriate. The pressure is not particularly limited, and it is preferable that the polymerization system is placed under reduced pressure to efficiently extract volatile components out of the polymerization system.

The ends of the polyamide-based resin may be capped with an end-capping agent such as a carboxylic acid compound or an amine compound, if necessary. When a monocarboxylic acid or monoamine is used as an end-capping agent, the terminal amino group concentration or the terminal carboxyl group concentration of the resulting nylon resin is reduced compared to the case where such an end-capping agent is not used. On the other hand, when a dicarboxylic acid or diamine is used as an end-capping agent, the sum of the terminal amino group concentration and the terminal carboxyl group concentration is unchanged, but the ratio of the terminal amino group concentration to the terminal carboxyl group concentration is changed.

Specific examples of the carboxylic acid compound include, but are not particularly limited to, the following: aliphatic monocarboxylic acids such as acetic acid, propionic acid, butyric acid, valeric acid, caproic acid, enanthic acid, caprylic acid, pelargonic acid, undecanoic acid, lauric acid, tridecanoic acid, myristic acid, myristoleic acid, palmitic acid, stearic acid, oleic acid, linoleic acid, and arachic acid; alicyclic monocarboxylic acids such as cyclohexanecarboxylic acid and methylcyclohexanecarboxylic acid; aromatic monocarboxylic acids such as benzoic acid, toluic acid, ethylbenzoic acid, and phenylacetic acid; aliphatic dicarboxylic acids such as oxalic acid, malonic acid, succinic acid, glutaric acid, adipic acid, pimelic acid, suberic acid, azelaic acid, sebacic acid, undecanedioic acid, dodecanedioic acid, brassylic acid, tetradecanedioic acid, pentadecanedioic acid, and octadecanedioic acid; alicyclic dicarboxylic acids such as cyclohexanedicarboxylic acid; and aromatic dicarboxylic acids such as phthalic acid, isophthalic acid, terephthalic acid, and naphthalenedicarboxylic acid.

Specific examples of the amine compound include, but are not particularly limited to, the following: aliphatic monoamines such as butylamine, pentylamine, hexylamine, heptylamine, octylamine, 2-ethylhexylamine, nonylamine, decylamine, undecylamine, dodecylamine, tridecylamine, tetradecylamine, pentadecylamine, hexadecylamine, octadecylamine, nonadecylamine, and icosylamine; alicyclic monoamines such as cyclohexylamine and methylcyclohexylamine; aromatic monoamines such as benzylamine and β-phenylethylamine; aliphatic diamines such as 1,4-diaminobutane, 1,5-diaminopentane, 1,6-diaminohexane, 1,7-diaminoheptane, 1,8-diaminooctane, 1,9-diaminononane, 1,10-diaminodecane, 1,11-diaminoundecane, 1,12-diaminododecane, 1,13-diaminotridecane, 1,14-diaminotetradecane, 1,15-diaminopentadecane, 1,16-diaminohexadecane, 1,17-diaminoheptadecane, 1,18-diaminooctadecane, 1,19-diaminononadecane, and 1,20-diaminoeicosane; alicyclic diamines such as cyclohexanediamine and bis-(4-aminohexyl)methane; and aromatic diamines such as xylylenediamine.

Although the terminal group concentration of the polyamide-based resin is not particularly limited, the terminal amino group concentration may be high so as to improve dyeability for the intended use of the fibers and design materials suitable for alloying for intended use of resin. Also, the terminal amino group concentration may be low so as to reduce coloration or gelation under long-term aging conditions. Moreover, both the terminal carboxyl group concentration and the terminal amino group concentration may be low so as to prevent the regeneration of lactam during remelting, filament breakage during melt spinning due to the formation of oligomers, mold deposit during continuous injection molding, and die mark formation during continuous film extrusion. The terminal group concentration may be adjusted according to the intended use, and both the terminal amino group concentration and the terminal carboxyl group concentration are preferably $1.0 \times 10^{-5}$ to $15.0 \times 10^{-5}$ eq/g, more preferably $2.0 \times 10^{-5}$ to $12.0 \times 10^{-5}$ eq/g, or particularly preferably $3.0 \times 10^{-5}$ to $11.0 \times 10^{-5}$ eq/g. In this specification, a numerical range indicated by " . . . to . . . " includes two end values in a manner similar to the numerical range indicated by " . . . or more and or . . . less".

There are some methods to add the end-capping agent. For example, the end-capping agent may be (i) added simultaneously with raw materials such as caprolactam in the initial stage of polymerization, (ii) added in the process of polymerization, or (iii) added while the molten nylon resin is passing through a vertical stirring-type thin film evaporator. The end-capping agent may be added as it is, or added after having been dissolved in a small amount of solvent.

In one or more embodiments of the present invention, the polyamide-based resin composition that constitutes the sheath may contain other resins in addition to the polyamide-based resin. Examples of the other resins include a vinyl chloride-based resin, a modacrylic-based resin, a polycarbonate-based resin, a polyolefin-based resin, and a polyphenylene sulfide-based resin. Other resins may be used individually or in combinations of two or more.

In one or more embodiments of the present invention, from the viewpoint of obtaining a texture and an appearance similar to those of human hair and improving the curling properties and curl-holding properties, the core of the core-sheath conjugate fiber for artificial hair is preferably composed of a polyester-based resin composition containing, as a main component, at least one polyester resin selected from the group consisting of polyalkylene terephthalate and a copolyester mainly containing polyalkylene terephthalate, and the sheath thereof is more preferably composed of a polyamide-based resin composition containing, as a main component, a polyamide-based resin mainly containing at least one selected from the group consisting of nylon 6 and nylon 66. In one or more embodiments of the present invention, the wording "polyamide-based resin mainly containing at least one selected from the group consisting of nylon 6 and nylon 66" refers to the polyamide-based resin containing 80 mol % or more of nylon 6 and/or nylon 66.

In one or more embodiments of the present invention, a resin composition that constitutes the core or the sheath may contain a pigment in order to obtain core-sheath conjugate fibers for artificial hair having a desired color. There is no particular limitation on the pigment, and ordinary pigments such as carbon black or anthraquinone-based pigments can be used, for example. Pigment masterbatch can also be used. A "pigment masterbatch" is obtained by kneading a pigment and a resin composition using a kneading machine such as an extruder and pelletizing (also be referred to as compounding) the resulting mixture, and pigments, which are usually considered to be difficult to handle because the pigments are in the fine powder form, can be easily handled by predispersing a pigment in a resin composition, which can suppress uneven coloring of the fibers to be obtained.

The amount of the pigment added to the polyester-based resin composition that constitutes the core is, but is not particularly limited to, preferably 0.005 parts by weight or more and 2 parts by weight or less, and more preferably 0.01 parts by weight or more and 1 part by weight or less, with respect to 100 parts by weight of the polyester-based resin. Further, the amount of the pigment added to the polyamide-based resin composition that constitutes the sheath is, but is not particularly limited to, preferably 0.005 parts by weight or more and 2 parts by weight or less, and more preferably 0.01 parts by weight or more and 1 part by weight or less, with respect to 100 parts by weight of the polyamide-based resin.

In one or more embodiments of the present invention, the core is composed of a polyester-based resin composition containing a bromine-based flame retardant, and the sheath is composed of a polyamide-based resin composition containing a bromine-based flame retardant, and thus a core-sheath fiber for artificial hair having flame resistance can be obtained. Examples of the bromine-based flame retardant include, but are not particularly limited to, the following: a brominated epoxy-based flame retardant; bromine-containing phosphate esters such as pentabromotoluene, hexabromobenzene, decabromodiphenyl, decabromodiphenyl ether, bis(tribromophenoxy)ethane, tetrabromophthalic anhydride, ethylene bis(tetrabromophthalimide), ethylene bis(pentabromophenyl), octabromotrimethylphenylindan, and tris(tribromoneopentyl)phosphate; brominated polystyrenes; brominated polybenzyl acrylates; brominated phenoxy resins; brominated polycarbonate oligomers; tetrabromobisphenol A and tetrabromobisphenol A derivatives such as tetrabromobisphenol A-bis(2,3-dibromopropyl ether), tetrabromobisphenol A-bis(allyl ether), and tetrabromobisphenol A-bis (hydroxyethyl ether); bromine-containing triazine compounds such as tris(tribromophenoxy)triazine; and bromine-containing isocyanuric acid compounds such as tris(2,3-dibromopropyl)isocyanurate. In particular, the brominated epoxy-based flame retardant is preferred in terms of heat resistance and flame resistance.

The brominated epoxy-based flame retardant may have an epoxy group or tribromophenol at the end of the molecule as a raw material. The structure of the brominated epoxy-based flame retardant after melt kneading is not particularly limited, and preferably has 80 mol % or more of a constitutional unit represented by the following chemical formula (1), acid group, and a phosphoric acid group. Alternatively, the end of the molecule of the brominated epoxy-based flame retardant may be bound to a polyester component through an ester group.

[Chemical formula 1]

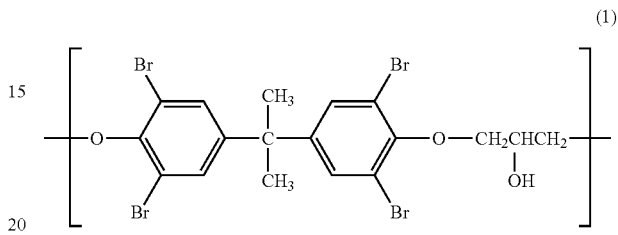

A part of the structure of the brominated epoxy-based flame retardant, except for the end of the molecule, may also be changed. For example, the secondary hydroxyl group and the epoxy group of the brominated epoxy-based flame retardant may be bound together to form a branched structure. Moreover, a part of the bromine of the chemical formula (1) may be eliminated or added if the bromine content in the molecule of the brominated epoxy-based flame retardant is not significantly changed.

The brominated epoxy-based flame retardant may be, e.g., a polymeric brominated epoxy-based flame retardant as represented by the following general formula (2). In the general formula (2), m is 1 to 1000. The polymeric brominated epoxy-based flame retardant represented by the general formula (2) may be a commercially available product such as a brominated epoxy-based flame retardant (trade name "SR-T2MP") manufactured by Sakamoto Yakuhin Kogyo Co., Ltd.

[Chemical formula 2]

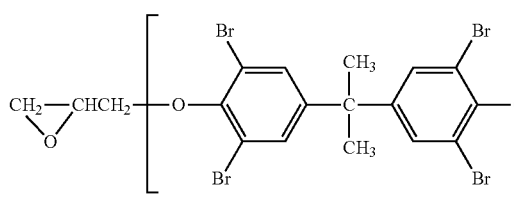 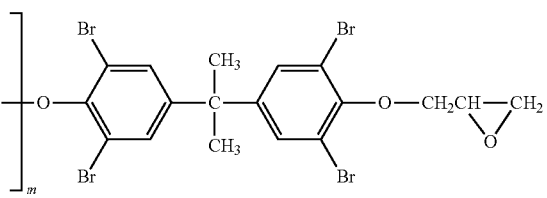

where the total number of the constitutional unit represented by the chemical formula (1) and other constitutional units in which at least a part of the chemical formula (1) has been modified is taken as 100 mol %. The structure at the end of the molecule of the brominated epoxy-based flame retardant may be changed after melt kneading. For example, the end of the molecule of the brominated epoxy-based flame retardant may be replaced by groups other than the epoxy group or tribromophenol, such as a hydroxyl group, a phosphoric The content of the brominated epoxy-based flame retardant in the core and/or the sheath is, but is not particularly limited to, 5 parts by weight or more and 40 parts by weight or less with respect to 100 parts by weight of the main component resin, for example. From the viewpoint of heat resistance and flame resistance, for example, it is preferable that the core is composed of a polyester-based resin composition containing at least one polyester resin selected from the group consisting of polyalkylene terephthalate and a copolyester mainly containing polyalkylene terephthalate in an amount of 100 parts by weight and a brominated epoxy flame retardant in an amount of 5 parts by weight or more and 40 parts by weight or less, and the sheath is composed of a polyamide-based resin composition containing a polyamide-based resin mainly containing at least one selected from the group consisting of nylon 6 and nylon 66 in an amount of 100 parts by weight and a brominated epoxy flame retardant in an amount of 5 parts by weight or more and 40 parts by weight or less.

In one or more embodiments of the present invention, a flame retardant auxiliary may be used in combination. The flame retardant auxiliary is not particularly limited, and from the viewpoint of flame resistance, it is preferable to use an antimony-based compound or a composite metal containing antimony in the core and/or the sheath, for example. Examples of the antimony-based compound include antimony trioxide, antimony tetroxide, antimony pentoxide, sodium antimonate, potassium antimonate, and calcium antimonate. In terms of the effects of the flame retardant auxiliary on the flame resistance and the texture, it is more preferable that the flame retardant auxiliary may be at least one selected from the group consisting of antimony trioxide, antimony pentoxide, and sodium antimonate.

The content of the flame retardant auxiliary is preferably, but is not particularly limited to, 0.1 parts by weight or more and 10 parts by weight or less with respect to 100 parts by weight of the main component resin, for example.

In particular, as a result of adding a flame retardant auxiliary to the polyamide-based resin composition that constitutes the sheath, an appropriate surface unevenness is formed on the fiber surface, thus obtaining core-sheath conjugate fibers for artificial hair having flame resistance, and a low gross and an appearance that are similar to those of human hair.

The core-sheath conjugate fibers for artificial hair may contain various additives as needed, to the extent that they do not interfere with the purpose of one or more embodiments of the present invention. The additives include, e.g., a heat-resistant agent, a stabilizer, a fluorescent agent, an antioxidant, and an antistatic agent.

(Production Method)

In one or more embodiments of the present invention, the core-sheath conjugate fibers for artificial hair can be produced by melt kneading the resin compositions that respectively constitute the core and the sheath using various ordinary kneading machines, and melt spinning the resulting composition using a core-sheath conjugate spinning nozzle. A core resin composition is prepared by melt kneading, using various ordinary kneading machines, a polyester-based resin composition obtained by dry-blending the above-described components such as the polyester resin and the brominated epoxy-based flame retardant, whereas a sheath resin composition is prepared by melt kneading, using various ordinary kneading machines, a polyamide-based resin composition obtained by dry-blending the above-described components such as the polyamide-based resin, the pigment, and the brominated epoxy-based flame retardant, and then the core-sheath conjugate fibers for artificial hair can be produced by melt spinning the core component and the sheath component using a core-sheath type conjugate spinning nozzle, for example. Examples of the kneading machine include a single-screw extruder, a twin-screw extruder, a roll, a Banbury mixer, and a kneader. In particular, the twin-screw extruder is preferred in terms of the adjustment of the degree of kneading and ease of operation.

As the method for producing the fiber in one or more embodiments of the present invention, it is preferable to use a melt spinning method, and, for example, in the case of a polyester-based resin composition, melt spinning is performed while the temperatures of an extruder, a gear pump, a nozzle, and the like are set to 250° C. or more and 300° C. or less, and in the case of a polyamide-based resin composition, melt spinning is performed while the temperatures of an extruder, a gear pump, a nozzle, and the like are set to 260° C. or more and 320° C. or less, after which the extruded yarns are cooled to a temperature of not more than the glass transition point of the corresponding resin, and wound up at a speed of 30 m/min or more and 5000 m/min or less, and thus melt spun yarns (undrawn yarns) are obtained.

Specifically, during the melt spinning, the polyester-based resin composition for constituting the core is supplied from a core extruder of a melt spinning machine, the polyamide-based resin composition for constituting the sheath is supplied from a sheath extruder of the melt spinning machine, and the molten polymer is extruded through a core-sheath type conjugate spinning nozzle (holes) with a predetermined shape, and thus the melt spun yarns (undrawn yarns) are obtained. It is preferable that the melt spun yarns (undrawn yarns) are hot drawn. The drawing may be performed by either a two-step method or a direct spinning-drawing method. In the two-step method, the melt spun yarns are once wound, and then drawn. In the direct spinning-drawing method, the melt spun yarns are drawn continuously without winding. The hot drawing may be performed by a single-stage drawing method or a multi-stage drawing method that includes two or more stages.

The heating means in the hot drawing may be, e.g., a heating roller, a heat plate, a steam jet apparatus, or a hot water bath, and they can be used in combination as appropriate.

Oils such as a fiber treatment agent and a softening agent may be applied to the core-sheath conjugate fibers for artificial hair to make the texture and feel of the fibers more similar to that of human hair. The fiber treatment agent may be, e.g., a silicone-based fiber treatment agent or a non-silicone-based fiber treatment agent used to improve the texture and combing property of the fibers.

The core-sheath conjugate fibers for artificial hair may be subjected to gear crimping. The gear crimping imparts gentle curves and natural appearance to the fibers, and also reduces the adhesion between the fibers, thereby also improving the combing property.

In the gear crimping, the fibers are generally heated to a temperature higher than the softening temperature and allowed to pass through two engaged gears so that the shape of the gears is transferred to the fibers. This can create curls on the fibers. Also, in the fiber processing stage, if necessary, curls having different shapes can be created by heating the core-sheath conjugate fibers for artificial hair at different temperatures.

(Hair Ornaments)

In one or more embodiments of the present invention, the core-sheath conjugate fibers for artificial hair can be used as artificial hair either individually or can also be used in combination with other artificial hair fibers and natural fibers such as human hair and animal hair. Examples of the other artificial hair fibers include acrylic fibers.

In one or more embodiments of the present invention, the core-sheath conjugate fibers for artificial hair may be used without particular limitation as long as they are used for hair ornaments. The core-sheath conjugate fibers for artificial hair may be used for hair wigs, hairpieces, weaving hair, hair extensions, braided hair, hair accessories, and doll hair.

The hair ornaments may include only the core-sheath conjugate fibers for artificial hair of one or more embodiments of the present invention. Alternatively, the hair ornaments may include the core-sheath conjugate fibers for artificial hair of the present invention in combination with other artificial hair fibers and natural fibers such as human hair and animal hair.

EXAMPLES

Hereinafter, one or more embodiments of the present invention will be described in more detail by way of examples. However, one or more embodiments of the present invention are not limited to the following examples.

The measurement methods and the evaluation methods used in Examples and Comparative Examples are as follows.

(Single Fiber Fineness)

Using an auto-vibronic fineness measuring device "DENIER COMPUTER DC-11" (manufactured by Search Co., Ltd.), 30 samples were measured to determine their respective single fiber fineness, and the average of the measured values of the samples was calculated and taken as the single fiber fineness of the core-sheath conjugate fibers.

(Evaluation of Fiber Cross-Section)

At room temperature (23° C.), fibers were cut to a length of 150 mm and 0.7 g of the cut fibers were bundled, inserted into a rubber tube, and heated at 80° C. so as to shrink the tube such that the fiber bundle was fixed so as not to be displaced. Thereafter, a portion of the tube was cut using a cutter, and thus a fiber bundle for cross-section observation having a length of 5 mm was prepared. An image of this fiber bundle was captured using a laser microscope ("VK-9500" manufactured by Keyence Corporation) at a magnification of 400 times, and thus a photograph of fiber cross-sections was obtained. Cross-sections of thirty fibers were selected at random from this fiber cross-section photograph, an image analysis device (image analysis software "Win ROOF" manufactured by Mitani Corporation) was used to measure the lengths of the major axes of the fiber cross-sections, the lengths of the first minor axes of the fiber cross-sections, the angles of the first sides of the hollow portions with respect to the major axes of the fiber cross-sections, the angles of the second sides of the hollow portions with respect to the major axes of the fiber cross-sections, the lengths of the first sides of the hollow portions, the lengths of the second sides of the hollow portions, the areas of the hollow portions, the areas of the cores, the areas of the sheaths, and the areas of the fiber cross-sections (the total areas of the hollow portions, the cores, and the sheaths). Note that values of the sizes on the fiber cross-section, such as a ratio (L/S1) of a length of the major axis of the fiber cross-section to a length of the first minor axis of the fiber cross-section, a ratio (Lc/Sc1) of a length of the major axis of the core cross-section to a length of the first minor axis of the core cross-section, the angle of the first side of the hollow portion with respect to the major axis of the fiber cross-section, the angle of the second side of the hollow portion with respect to the fiber cross-sectional major axis, the length of the first side of the hollow portion, and the length of the second side of the hollow portion, are each the corresponding average value of the measured values of fiber cross-sections of the thirty fibers, which were selected at random.

(Texture)

Sensory evaluation was performed by a professional cosmetologist, and the texture was evaluated in the following four stages.

A: The texture is very good and equivalent to that of human hair.

B: The texture is good, but slightly inferior to that of human hair.

C: The texture is good, but inferior to that of human hair.

D: The texture is poor and significantly inferior to that of human hair.

(Evaluation of Durability)

Hair samples were damaged according to the following procedure, and the durability was evaluated using a bulk change ratio calculated based on bulk values before and after the hair samples were damaged.

(1) A hair sample (total length was 16 inches, 15 g) was prepared in which fibers were bundled, one end portion of the fiber bundle was fixed with a rubber cord to form a base, and a layer portion was formed such that the fibers were partially displaced at the other end, and the initial bulk value of the layer portion (4 inches) was measured.

(2) Hair of the hair sample was tangled by raising the hair up using a brush.

(3) Hands were used to rub the base ten times, the layer portion ten times, and the entire fiber bundle ten times so as to further tangle the hair.

(4) The tangled hair was combed out using a brush.

(5) The operations (2) to (4) were repeated ten times to facilitate the damage.

(6) The bulk value of the layer portion of the hair sample after the damage was facilitated was measured, and the obtained value was used as the bulk value obtained after the hair was damaged.

(7) The bulk change ratio before and after the damage was calculated based on the mathematical formula (3) below, and was evaluated in the following four stages.

$$\text{Bulk change ratio (\%) after damage} = \text{Bulk value after damage/Initial bulk value} \times 100 \quad (3)$$

A: The bulk change ratio is less than 200%

B: The bulk change ratio is 200% or more and less than 250%

C: The bulk change ratio is 250% or more and less than 300%

D: The bulk change ratio is 300% or more (Measurement of Bulk Values)

Figure 3A:
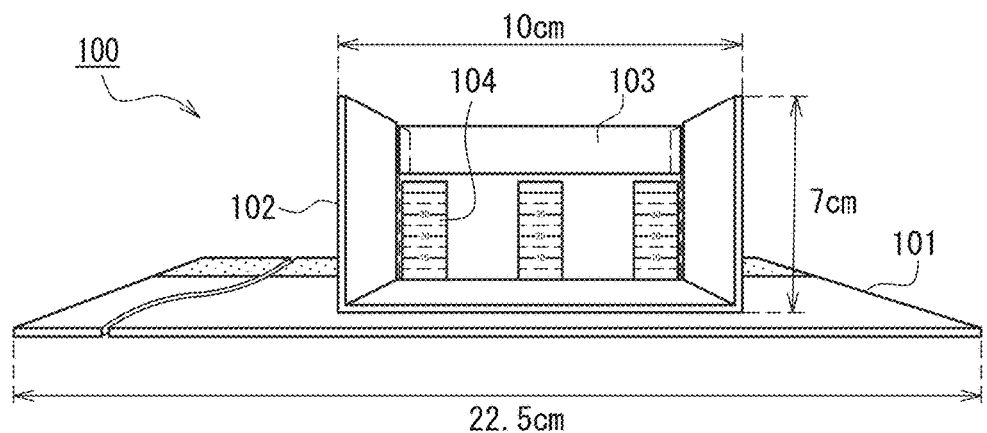
FIG. 3A is a schematic diagram illustrating a bulk measurement device.
Figure 3B:
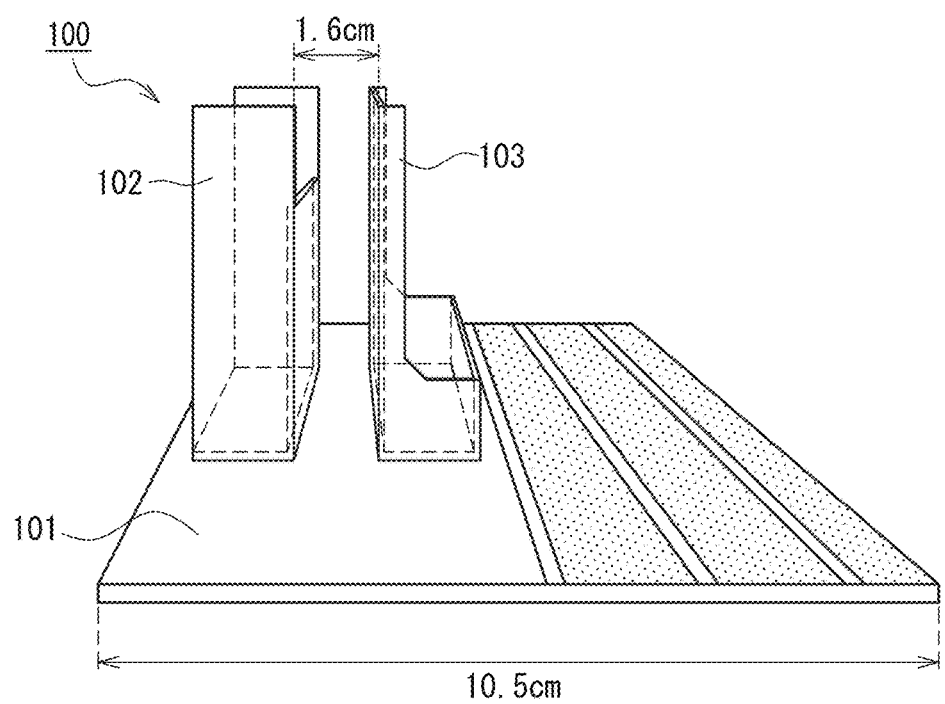
FIG. 3B is a schematic diagram illustrating a bulk measurement device.
Figure 3C:
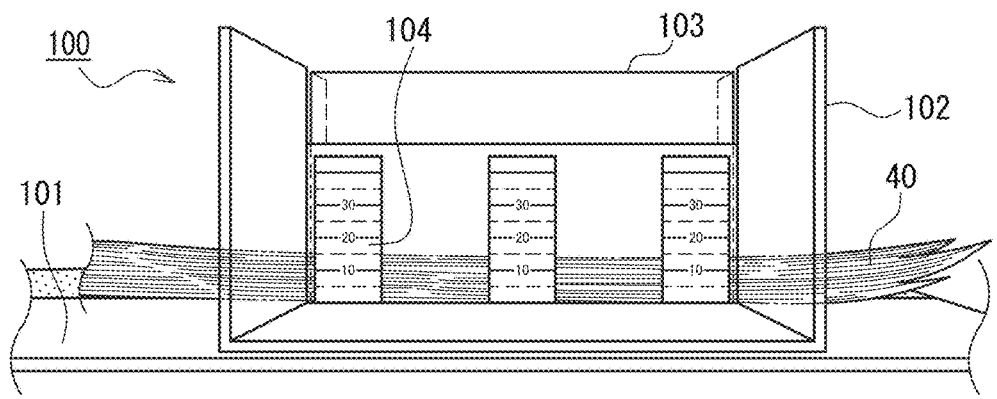
FIG. 3C is a schematic diagram illustrating a bulk measurement device.

The bulk values of the hair samples were measured using the bulk measurement device illustrated in FIGS. 3A to 3C. As illustrated in FIGS. 3A to 3C, a bulk measurement device 100 includes a supporting base 101, and holding tools 102 and 103 that are arranged on the supporting base 101 and hold hair. A scale 104 is attached to the holding tool 102 with a piece of transparent tape (not shown). The supporting base 101, and the holding tools 102 and 103 are composed of an acrylic resin. As illustrated in FIG. 3C, a hair sample 40 was placed between the holding tool 102 and the holding tool 103 such that the center of the holding tool 102 in the length direction and the center of the layer portion of the hair sample 40 matched each other, and bulk values were measured.

(Curl Setting Properties)

2.8 g of filaments were formed into a hair tress with a length of 25 cm and wrapped around a pipe with a diameter of 32 mm at room temperature (23° C.), curled at 120° C. for 60 minutes, and aged at room temperature (23° C.) for 60 minutes. Thereafter, one end of the curled filaments was fixed and suspended, and the length of the curled filaments was measured. The curl setting properties were evaluated using the filament length as an index for curl setting properties in the following four stages.

A: The length of the curled filaments is less than 14 cm.
B: The length of the curled filaments is 14 cm or more and less than 15 cm.
C: The length of the curled filaments is 15 cm or more and less than 17 cm.
D: The length of the curled filaments is 17 cm or more.

(Flame Resistance)

The limiting oxygen index (LOI value) was measured as an evaluation index for flame resistance according to the JIS L 1091 Method E (oxygen index method test). Specifically, two ends of a filament (length was 16 cm, weight was 0.25 g) were loosely tied with a piece of double-sided tape, sandwiched with a twist tester and twisted. When the filament was sufficiently twisted, the filament was folded in two at the middle thereof and twisted together. Two ends of the twisted filament were fixed with cellophane (registered trademark) tape such that the total length of the resulting filament was 7 cm. The resulting sample was pre-dried at 105° C. for 60 minutes, and then dried in a desiccator for 30 minutes or more. The dried sample was left for 40 seconds under a predetermined oxygen concentration, and then, the top of the sample was ignited with a gas igniter whose flame length was narrowed to 8 to 12 mm, and the igniter was removed away after the sample caught the fire. The oxygen concentration at which the filament burned by 5 cm or more or continued burning for 3 minutes or more was examined, the test was repeated three times under the same conditions, and the obtained value was used as an LOI value and was evaluated in the following four stages.

A: The LOI value is 27 or more.
B: The LOI value is 26 or more and less than 27.
C: The LOI value is 25 or more and less than 26.
D: The LOI value is less than 25.

Example 1

First, 100 parts by weight of polyethylene terephthalate pellets (EastPET trade name "A-12", which is referred to as PET, manufactured by East West Chemical Private Limited) were mixed with 30 parts by weigh of a brominated epoxy-based flame retardant (trade name "SR-T2MP" manufactured by Sakamoto Yakuhin Kogyo Co., Ltd.), 3 parts by weight of sodium antimonate (trade name "SA-A" manufactured by Nihon Seiko Co., Ltd.), 3.0 parts by weight of black pigment masterbatch (trade name "PESM 22367 BLACK (20)" manufactured by Dainichiseika Color & Chemicals Mfg. Co., Ltd., pigment: 20% by weight, base resin: polyester-based resin), 0.6 parts by weight of yellow pigment masterbatch (trade name "PESM 1001 YELLOW (20)" manufactured by Dainichiseika Color & Chemicals Mfg. Co., Ltd., pigment: 20% by weight, base resin: polyester-based resin), and 0.2 parts by weight of red pigment masterbatch (trade name "PESM 3005 RED (20)" manufactured by Dainichiseika Color & Chemicals Mfg. Co., Ltd., pigment: 20% by weight, base resin: polyester-based resin). The mixture was dry blended and then fed into a twin-screw extruder, where it was melt-kneaded at a barrel temperature of 280° C. and pelletized. Thus, a polyester-based resin composition was obtained.

Then, 100 parts by weight of nylon 6 (also referred to as PA6) (trade name "A1030BRL" manufactured by Unitika Ltd.) were mixed with 12 parts by weight of a brominated epoxy-based flame retardant (trade name "SR-T2MP manufactured by Sakamoto Yakuhin Kogyo Co., Ltd.), 2 parts by weight of sodium antimonate (trade name "SA-A" manufactured by Nihon Seiko Co., Ltd.), 2.0 parts by weight of black pigment masterbatch (trade name "PAM (F) 25005 BLACK (20)" manufactured by Dainichiseika Color & Chemicals Mfg. Co., Ltd.), 0.8 parts by weight of yellow pigment masterbatch (trade name "PAM (F) 28990 YELLOW (20)" manufactured by Dainichiseika Color & Chemicals Mfg. Co., Ltd.), and 0.5 parts by weight of red pigment masterbatch (trade name "PAM (F) 28991 RED (20)" manufactured by Dainichiseika Color & Chemicals Mfg. Co., Ltd.). The mixture was dry blended and then fed into a twin-screw extruder, where it was melt-kneaded at a barrel temperature of 260° C. and pelletized. Thus, a polyamide-based resin composition was obtained.

Next, the polyester-based resin composition in the form of pellets and the polyamide-based resin composition in the form of pellets were fed into extruders, respectively, and then extruded through a core-sheath type conjugate spinning nozzle (pores) having a nozzle shape shown in Table 1 below at a set temperature of 270° C. and wound up at a speed of 40 to 200 m/min. This resulted in undrawn yarns of core-sheath conjugate fibers containing the polyester-based resin composition as a core and the polyamide-based resin composition as a sheath and having a core-to-sheath area ratio of 5:5.

The undrawn yarns thus obtained were drawn to 3 times and taken up at a speed of 45 m/min by using a heating roller at 85° C. Subsequently, the drawn yarns were further heat-treated and wound up at a speed of 45 m/min by using a heating roller at 200° C. A polyether oil (trade name "KWC-Q" manufactured by Marubishi Oil Chemical Corporation) was applied to the drawn yarns so that the amount of oil applied was 0.20% omf (i.e., the weight percentage of the oil (pure content) with respect to the dry fiber weight). Then, the resulting yarns were dried, and thus core-sheath conjugate fibers with a single fiber fineness shown in Table 1 below were obtained.

Example 2

Core-sheath conjugate fibers were produced in the same manner as Example 1 except that a core-sheath type conjugate spinning nozzle (pores) having the nozzle shape shown in Table 1 below was used.

Example 3

Core-sheath conjugate fibers were produced in the same manner as Example 1 except that the resin used for the sheath was changed to nylon 66 (may also be referred to as "PA66") (trade name "Amilan CM3001" manufactured by Toray Industries, Inc.), the barrel temperature was set to 280° C. during pelletization, the nozzle temperature was set to 280° C., and the core-to-sheath area ratio was 7:3.

Example 4

Core-sheath conjugate fibers were produced in the same manner as Example 1 except that the resin used for the core was changed to polybutylene terephthalate (may also be referred to as "PBT") (trade name "Novaduran 5020" manufactured by Mitsubishi Chemical Corporation), the barrel temperature was set to 260° C. during pelletization, the nozzle temperature was set to 260° C., and the core-to-sheath area ratio was 3:7.

Comparative Example 1

Core-sheath conjugate fibers were produced in the same manner as Example 1 except that the core-to-sheath area ratio was 9:1.

Comparative Example 2

Core-sheath conjugate fibers were produced in the same manner as Example 1 except that the core-to-sheath area ratio was 1:9.

Comparative Example 3

Core-sheath conjugate fibers were produced in the same manner as Example 1 except that a core-sheath type conjugate spinning nozzle (pores) having the nozzle shape shown in Table 1 below was used.

Comparative Example 4

Core-sheath conjugate fibers were produced in the same manner as Example 1 except that a core-sheath type conjugate spinning nozzle (pores) having the nozzle shape shown in Table 1 below was used.

Comparative Example 5

100 parts by weight of polyethylene terephthalate pellets (EastPET trade name "A-12" manufactured by East West Chemical Private Limited) were mixed with 3.0 parts by weight of black pigment masterbatch (trade name "PESM 22367 BLACK (20)" manufactured by Dainichiseika Color & Chemicals Mfg. Co., Ltd., pigment: 20% by weight, base resin: polyester-based resin), 0.6 parts by weight of yellow pigment masterbatch (trade name "PESM 1001 YELLOW (20)" manufactured by Dainichiseika Color & Chemicals Mfg. Co., Ltd., pigment: 20% by weight, base resin: polyester-based resin), and 0.2 parts by weight of red pigment masterbatch (trade name "PESM 3005 RED (20)" manufactured by Dainichiseika Color & Chemicals Mfg. Co., Ltd., pigment: 20% by weight, base resin: polyester-based resin). The mixture was dry blended and then fed into a twin-screw extruder, where it was melt-kneaded at a barrel temperature of 280° C. and pelletized. Thus, a polyester-based resin composition was obtained.

Then, core-sheath conjugate fibers were produced in the same manner as Example 1 except that 100 parts by weight of nylon 6 (trade name "A1030BRL" manufactured by Unitika Ltd.) were mixed with 2.0 parts by weight of black pigment masterbatch (trade name "PESM 22367 BLACK (20)" manufactured by Dainichiseika Color & Chemicals Mfg. Co., Ltd.), 0.8 parts by weight of yellow pigment masterbatch (trade name "PESM 1001 YELLOW (20)" manufactured by Dainichiseika Color & Chemicals Mfg. Co., Ltd.), and 0.5 parts by weight of red pigment masterbatch (trade name "PESM 3005 RED (20)" manufactured by Dainichiseika Color & Chemicals Mfg. Co., Ltd.), the mixture was dry blended and then fed into a twin-screw extruder, where it was melt-kneaded at a barrel temperature of 260° C. and pelletized, and thus, a polyamide-based resin composition was obtained.

The cross-sectional shapes of the fibers of the examples and comparative examples were evaluated and observed as described above. Furthermore, the texture, firmness, durability, the curl setting properties, and flame resistance of the fibers of the examples and comparative examples were evaluated as described above. Table 1 shows the results.

TABLE 1

|  | Ex. 1 | Ex. 2 | Ex. 3 | Ex. 4 | Comp. Ex. 1 |
|---|---|---|---|---|---|
| Nozzle shape (fiber) | flat bilobed | flat bilobed | flat bilobed | flat bilobed | flat bilobed |
| Nozzle shape (core) | flat bilobed | flat bilobed | flat bilobed | flat bilobed | flat bilobed |
| Nozzle shape (hollow portion) | hexagonal | quadrangular | hexagonal | hexagonal | hexagonal |
| Main component resin (core) | PET | PET | PET | PBT | PET |
| Main component resin (sheath) | PA6 | PA6 | PA66 | PA6 | PA6 |
| Bromine-based flame retardant (core) | added | added | added | added | added |
| Bromine-based flame retardant (sheath) | added | added | added | added | added |
| Core-to-sheath area ratio | 5:5 | 5:5 | 7:3 | 3:7 | 9:1 |
| Single fiber fineness (dtex) | 58 | 59 | 61 | 55 | 64 |
| Cross-sectional shape (fiber) | flat bilobed | flat bilobed | flat bilobed | flat bilobed | flat bilobed |
| Cross-sectional shape (core) | flat bilobed | flat bilobed | flat bilobed | flat bilobed | flat bilobed |
| Cross-sectional shape (hollow portion) | hexagonal | quadrangular | hexagonal | hexagonal | hexagonal |
| Hollowness ratio (%) | 10 | 21 | 9 | 13 | 11 |
| L/S1 | 1.3 | 1.3 | 1.2 | 1.4 | 1.2 |
| Lc/Sc1 | 1.7 | 1.6 | 1.7 | 1.6 | 1.6 |
| Angle of first side of hollow portion with respect to major axis of the fiber cross-section (degrees) | 93 | 99 | 90 | 88 | 95 |
| Angle of second side of hollow portion with respect to major axis of the fiber cross-section (degrees) | 90 | 91 | 89 | 92 | 92 |
| Length of first side of hollow portion (μm) | 13.4 | 19.4 | 13.1 | 15.6 | 15.0 |
| Length of second side of hollow portion (μm) | 14.5 | 19.1 | 11.9 | 15.4 | 14.3 |
| Photograph of cross-section | FIG. 4 | — | — | — | — |
| Texture | B | B | C | A | D |
| Durability | B | B | C | A | D |
| Curl setting properties | B | B | A | C | A |

TABLE 1-continued

| | | | | | |
|---|---|---|---|---|---|
| Flame resistance | B | B | A | C | A |

| | Comp. Ex. | | | |
|---|---|---|---|---|
| | 2 | 3 | 4 | 5 |
| Nozzle shape (fiber) | flat bilobed | circular | flat bilobed | flat bilobed |
| Nozzle shape (core) | flat bilobed | circular | flat bilobed | flat bilobed |
| Nozzle shape (hollow portion) | hexagonal | circular | circular | hexagonal |
| Main component resin (core) | PET | PET | PET | PET |
| Main component resin (sheath) | PA6 | PA6 | PA6 | PA6 |
| Bromine-based flame retardant (core) | added | added | added | not added |
| Bromine-based flame retardant (sheath) | added | added | added | not added |
| Core-to-sheath area ratio | 1:9 | 5:5 | 5:5 | 5:5 |
| Single fiber fineness (dtex) | 52 | 58 | 57 | 53 |
| Cross-sectional shape (fiber) | flat bilobed | circular | flat bilobed | flat bilobed |
| Cross-sectional shape (core) | flat bilobed | circular | flat bilobed | flat bilobed |
| Cross-sectional shape (hollow portion) | hexagonal | circular | circular | hexagonal |
| Hollowness ratio (%) | 13 | 25 | 4 | 9 |
| L/S1 | 1.3 | 1.0 | 1.2 | 1.3 |
| Lc/Sc1 | 1.5 | 1.0 | 1.6 | 1.6 |
| Angle of first side of hollow portion with respect to major axis of the fiber cross-section (degrees) | 87 | — | — | 91 |
| Angle of second side of hollow portion with respect to major axis of the fiber cross-section (degrees) | 88 | — | — | 94 |
| Length of first side of hollow portion (μm) | 15.8 | — | — | 11.7 |
| Length of second side of hollow portion (μm) | 16.2 | — | — | 12.2 |
| Photograph of cross-section | — | FIG. 5 | — | — |
| Texture | A | D | B | B |
| Durability | A | D | B | B |
| Curl setting properties | D | B | D | B |
| Flame resistance | D | B | B | D |

Figure 4:
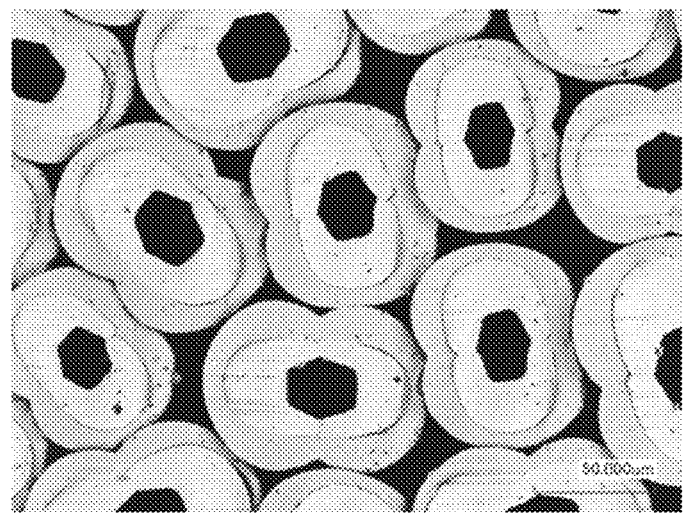
FIG. 4 is a laser microscopic photograph of fiber cross-sections of fibers of Example 1.
Figure 5:
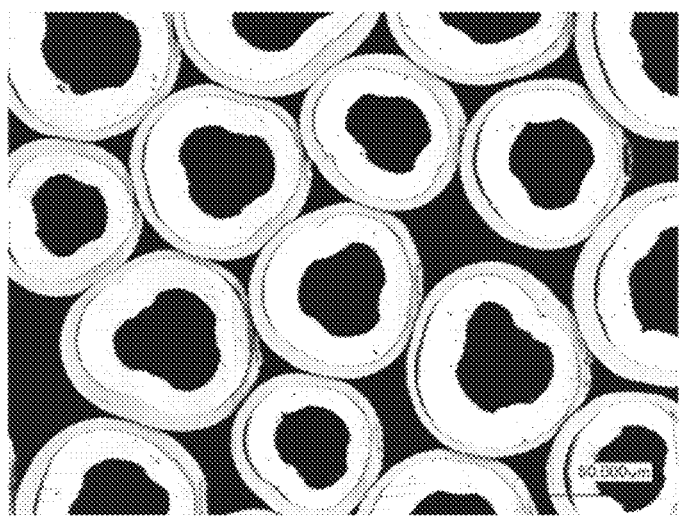
FIG. 5 is a laser microscopic photograph of fiber cross-sections of fibers of Comparative Example 3.

FIG. 4 is a laser microscopic photograph of cross-sections of the fibers of Example 1. As can be seen from FIG. 4, in the core-sheath conjugate fibers for artificial hair of Example 1, the fibers and the cores had a flat bibbed cross-sectional shape, and the hollow portions had a substantially regular hexagonal cross-sectional shape. FIG. 5 is a laser microscopic photograph of cross-sections of the fibers of Comparative Example 3. As illustrated in FIG. 5, in the core-sheath conjugate fibers for artificial hair of Comparative Example 3, the fibers, the cores, and the hollow portions all had a substantially circular cross-sectional shape.

As can be seen from Table 1, the fibers of Examples 1 to 4 had a texture similar to that of human hair, and high durability and flame resistance, and favorable curl setting properties.

On the other hand, because the fibers of Comparative Example 1 had a very low sheath ratio, the cores thereof were exposed from the fiber surface, and the fibers of Comparative Example 1 had a very bad texture and low durability, and thus were not formed as good fibers. The fibers of Comparative Example 2 had a very low core ratio and thus had very poor curl setting properties. The fibers of Comparative Example 3 had a circular cross-section and the fiber surface did not have unevenness. Thus, the fibers of Comparative Example 3 had an unnatural appearance, a poor texture, and low durability. Further, separation of the sheath from the core was also observed at the core-sheath interface, and the fibers of Comparative Example 3 were not formed as good fibers. The hollow portions of the fibers of Comparative Example 4 had a circular cross-sectional shape, and the fibers thereof had a low hollowness ratio. Thus, the fibers of Comparative Example 4 had poor curl setting properties. The cores and the sheaths of the fibers of Comparative Example 5 did not contain a flame retardant, and thus the fibers thereof had a very low flame resistance.

One or more embodiments of the present invention preferably include at least the following embodiments, but are not limited thereto.

[1] A core-sheath conjugate fiber for artificial hair comprising:
a core; and
a sheath,
wherein the core is composed of a polyester-based resin composition containing a polyester-based resin, and the sheath is composed of a polyamide-based resin composition containing a polyamide-based resin,
the polyester-based resin composition and the polyamide-based resin composition contain a bromine-based flame retardant,
a core-to-sheath area ratio of the core to the sheath of the core-sheath conjugate fiber for artificial hair is 2:8 to 8:2, and
a fiber cross-section of the core-sheath conjugate fiber for artificial hair has a flat multilobed shape, the fiber cross-section includes a hollow portion, a ratio of an area of the hollow portion to a total area of the fiber cross-section is 5% or more and 30% or less, and the hollow portion has a polygonal shape.

[2] The core-sheath conjugate fiber for artificial hair according to [1], wherein the fiber cross-section has a flat bibbed shape.

[3] The core-sheath conjugate fiber for artificial hair according to [1] or [2], wherein a core cross-section of the core-sheath conjugate fiber for artificial hair has a flat bibbed shape.

[4] The core-sheath conjugate fiber for artificial hair according to any one of [1] to [3], wherein a length of a major axis of the fiber cross-section and a length of a first minor axis of the fiber cross-section satisfy the equation (1) below, where the major axis of the fiber cross-section is a longest straight line among an axisymmetric axis and straight lines connecting any two points on the outer circumference of the fiber cross-section so as to be parallel to the axisymmetric axis, and the first minor axis of the fiber cross-section is a longest straight line formed when any two points on the outer circumference of the fiber cross-section are connected perpendicularly to the major axis of the fiber cross-section, the length of the major axis of the fiber cross-section/the length of the first minor axis of the fiber cross-section=1.1 or more and 2.0 or less (1).

[5] The core-sheath conjugate fiber for artificial hair according to any one of [1] to [4], wherein a length of a major axis of a core cross-section and a length of a first minor axis of the core cross-section satisfy the equation (2) below, where the major axis of the core cross-section is a longest straight line among an axisymmetric axis and straight lines connecting any two points on the outer circumference of the core cross-section so as to be parallel to the axisymmetric axis, and the first minor axis of the core cross-section is a longest straight line formed when any two points on the outer circumference of the core cross-section are connected perpendicularly to the major axis of the core cross-section, the length of the major axis of the core cross-section/the length of the first minor axis of the core cross-section=1.3 or more and 2.0 or less (2).

[6] The core-sheath conjugate fiber for artificial hair according to any one of [1] to [5], wherein the hollow portion has a polygonal shape having a first side with an angle of 80 degrees or more and 100 degrees or less with respect to a major axis of the fiber cross-section, and a second side with an angle of 80 degrees or more and 100 degrees or less with respect to the major axis of the fiber cross-section.

[7] The core-sheath conjugate fiber for artificial hair according to [6], wherein an angle between the first side and the second side is in a range of 0 degrees or more and 40 degrees or less.

[8] The core-sheath conjugate fiber for artificial hair according to any one of claims [1] to [7], wherein the hollow portion has at least one polygonal shape selected from the group consisting of a quadrangular shape, a pentagonal shape, a hexagonal shape, a heptagonal shape, and an octagonal shape.

[9] The core-sheath conjugate fiber for artificial hair according to any one of [1] to [8], wherein the polyester-based resin composition contains at least one polyester-based resin selected from the group consisting of polyalkylene terephthalate and a copolyester mainly containing polyalkylene terephthalate.

[10] The core-sheath conjugate fiber for artificial hair according to any one of [1] to [9], wherein the polyamide-based resin composition contains a polyamide-based resin mainly containing at least one selected from the group consisting of nylon 6 and nylon 66.

[11] A hair ornament comprising the core-sheath conjugate fiber for artificial hair according to any one of [1] to [10].

[12] The hair ornament according to [11], wherein the hair ornament is any one selected from the group consisting of a hair wig, a hairpiece, weaving hair, a hair extension, braided hair, a hair accessory, and doll hair.

[13] A method for producing the core-sheath conjugate fiber for artificial hair according to any one of [1] to [10], comprising:

melt spinning a polyester-based resin composition and a polyamide-based resin composition, using a core-sheath conjugate spinning nozzle, wherein a hollow portion having a polygonal shape is formed in a fiber cross-section, and a ratio of the area of the hollow portion to the total area of the fiber cross-section is 5% or more and 30% or less.

DESCRIPTION OF REFERENCE NUMERALS

1 Core-sheath conjugate fiber for artificial hair (cross-section)
10 Sheath
11 Major axis of the fiber cross-section
12 First minor axis of the fiber cross-section
20 Core
21 Major axis of the core cross-section
22 First minor axis of the core cross-section
30 Hollow portion
31a First side of hollow portion
31b Second side of hollow portion
40 Hair sample
100 Bulk measurement device
101 Supporting base
102, 103 Holding tool
104 Scale

The invention claimed is:

1. A core-sheath conjugate fiber for artificial hair comprising:
a core; and
a sheath,
wherein the core comprises a polyester-based resin composition comprising a polyester-based resin, and the sheath comprises a polyamide-based resin composition comprising a polyamide-based resin,
the polyester-based resin composition and the polyamide-based resin composition comprise a bromine-based flame retardant,
a core-to-sheath area ratio of an area of the core to an area of the sheath of the core-sheath conjugate fiber for artificial hair is 2:8 to 8:2,
a fiber cross-section of the core-sheath conjugate fiber for artificial hair has a flat multilobed shape, the fiber cross-section includes a hollow portion, a ratio of an area of the hollow portion to a total area of the fiber cross-section is 5% or more and 30% or less, and the hollow portion has a polygonal shape, and
the core-sheath conjugate fiber for artificial hair has a concentric structure in which center positions of the core and the hollow portion match a center position of the fiber.

2. The core-sheath conjugate fiber for artificial hair according to claim 1, wherein the fiber cross-section has a flat bilobed shape.

3. The core-sheath conjugate fiber for artificial hair according to claim 1,
wherein a core cross-section of the core-sheath conjugate fiber for artificial hair has a flat bilobed shape.

4. The core-sheath conjugate fiber for artificial hair according to claim 1,
wherein a length of a major axis of the fiber cross-section and a length of a first minor axis of the fiber cross-section satisfy the equation (1) below, where the major axis of the fiber cross-section is a longest straight line among an axisymmetric axis and straight lines connecting any two points on the outer circumference of the fiber cross-section so as to be parallel to the axisymmetric axis, and the first minor axis of the fiber cross-section is a longest straight line formed when any two points on the outer circumference of the fiber cross-section are connected perpendicularly to the major axis of the fiber cross-section,
the length of the major axis of the fiber cross-section/the length of the first minor axis of the fiber cross-section=1.1 or more and 2.0 or less (1).

5. The core-sheath conjugate fiber for artificial hair according to claim 1,
wherein a length of a major axis of a core cross-section and a length of a first minor axis of the core cross-section satisfy the equation (2) below, where the major axis of the core cross-section is a longest straight line among an axisymmetric axis and straight lines connecting any two points on the outer circumference of the core cross-section so as to be parallel to the axisymmetric axis, and the first minor axis of the core cross-section is a longest straight line formed when any two points on the outer circumference of the core cross-section are connected perpendicularly to the major axis of the core cross-section, satisfy the equation (2) below,
the length of the major axis of the core cross-section/the length of the first minor axis of the core cross-section=1.3 or more and 2.0 or less (2).

6. The core-sheath conjugate fiber for artificial hair according to claim 1,
wherein the hollow portion has a polygonal shape having a first side with an angle of 80 degrees or more and 100 degrees or less with respect to a major axis of the fiber cross-section, and a second side with an angle of 80 degrees or more and 100 degrees or less with respect to the major axis of the fiber cross-section.

7. The core-sheath conjugate fiber for artificial hair according to claim 6,
wherein an angle between the first side and the second side is in a range of 0 degrees or more and 40 degrees or less.

8. The core-sheath conjugate fiber for artificial hair according to claim 6,
wherein both of the first side and the second side of the hollow portion have a length of 10 μm or more and 30 μm or less.

9. The core-sheath conjugate fiber for artificial hair according to claim 1,
wherein the hollow portion has at least one polygonal shape selected from the group consisting of a quadrangular shape, a pentagonal shape, a hexagonal shape, a heptagonal shape, and an octagonal shape.

10. The core-sheath conjugate fiber for artificial hair according to claim 1,
wherein the polyester-based resin composition comprises at least one polyester-based resin selected from the group consisting of polyalkylene terephthalate and a copolyester comprising 80 mol % or more of polyalkylene terephthalate.

11. The core-sheath conjugate fiber for artificial hair according to claim 1,
wherein the polyamide-based resin composition comprises a polyamide-based resin comprising 80 mol % or more of at least one selected from the group consisting of nylon 6 and nylon 66.

12. A hair ornament comprising
the core-sheath conjugate fiber for artificial hair according to claim 1.

13. The hair ornament according to claim 12,
wherein the hair ornament is at least one selected from the group consisting of a hair wig, a hairpiece, weaving hair, a hair extension, braided hair, a hair accessory, and doll hair.

14. The hair ornament according to claim 12,
wherein the hollow portion has a polygonal shape having a first side with an angle of 80 degrees or more and 100 degrees or less with respect to a major axis of the fiber cross-section, and a second side with an angle of 80 degrees or more and 100 degrees or less with respect to the major axis of the fiber cross-section.

15. The hair ornament according to claim 14,
wherein an angle between the first side and the second side is in a range of 0 degrees or more and 40 degrees or less.

16. The hair ornament according to claim 14,
wherein the hollow portion has at least one polygonal shape selected from the group consisting of a quadrangular shape, a pentagonal shape, a hexagonal shape, a heptagonal shape, and an octagonal shape.

17. The hair ornament according to claim 14,
wherein both of the first side and the second side of the hollow portion have a length of 10 μm or more and 30 μm or less.

18. A method for producing the core-sheath conjugate fiber for artificial hair according to claim 1, comprising:
melt spinning a polyester-based resin composition and a polyamide-based resin composition, using a core-sheath conjugate spinning nozzle,
wherein a hollow portion having a polygonal shape is formed in a fiber cross-section, and a ratio of the area of the hollow portion to the total area of the fiber cross-section is 5% or more and 30% or less.

* * * * *